(12) United States Patent
Chang

(10) Patent No.: US 11,813,601 B1
(45) Date of Patent: Nov. 14, 2023

(54) THERMAL CRACKING SYSTEM

(71) Applicant: ENERSOURCE TECHNOLOGY CORP., Taipei (TW)

(72) Inventor: Yao-Yu Chang, Taipei (TW)

(73) Assignee: ENERSOURCE TECHNOLOGY CORP., Taipei (TW)

( * ) Notice: Subject to any disclaimer, the term of this patent is extended or adjusted under 35 U.S.C. 154(b) by 0 days.

(21) Appl. No.: 18/133,239

(22) Filed: Apr. 11, 2023

(30) Foreign Application Priority Data

Jan. 5, 2023 (TW) ................................. 112100410

(51) Int. Cl.
*B01J 6/00* (2006.01)
(52) U.S. Cl.
CPC ...................... *B01J 6/008* (2013.01)
(58) Field of Classification Search
CPC ....................................................... B01J 6/008

USPC ......................................................... 422/307
See application file for complete search history.

(56) References Cited

FOREIGN PATENT DOCUMENTS

| | | | |
|---|---|---|---|
| CN | 2491452 Y | | 5/2000 |
| CN | 203159540 U | * | 8/2013 |
| CN | 109679672 A | | 4/2019 |
| CN | 111770886 A | | 10/2020 |
| CN | 1338341 A | | 3/2022 |
| TW | 286626 | | 11/1996 |

* cited by examiner

*Primary Examiner* — Huy Tram Nguyen
(74) *Attorney, Agent, or Firm* — Birch, Stewart, Kolasch & Birch, LLP

(57) ABSTRACT

A thermal cracking system includes a thermal cracking treatment unit whose technical features allow a regenerated oil or a regenerated auxiliary gas to be extracted for use as a combustible material in the combustion process of the thermal cracking treatment unit, thereby contributing substantially to recycling and reuse in order to achieve sustainable development of the environment effectively.

20 Claims, 5 Drawing Sheets

THERMAL CRACKING SYSTEM

BACKGROUND OF THE INVENTION

1. Technical Field

The present invention relates to thermal cracking techniques and more particularly to a waste treatment system that performs thermal cracking of waste.

2. Description of Related Art

The plastic and rubber industry is nowadays developing rapidly and being depended on by consumers to an increasing extent, resulting in more and more plastic and rubber waste. Currently, the treatment of plastic and rubber waste generally entails incineration in an incinerator, but this treatment method inevitably produces a huge amount of harmful gases, which pollute the entire environment. The incineration of plastic and rubber waste, therefore, works against the objective of sustainable environmental development of the United Nations' 17 Sustainable Development Goals (SDGs).

In view of the above, the applicant aimed to improve the prior art by providing an environmentally friendly thermal cracking system for waste.

BRIEF SUMMARY OF THE INVENTION

To solve the aforesaid problem of the prior art, the present invention provides a thermal cracking system. The thermal cracking system includes a thermal cracking treatment unit whose technical features allow a regenerated oil or a regenerated auxiliary gas to be extracted for use as a combustible material in the combustion process of the thermal cracking treatment unit, thereby contributing substantially to recycling and reuse in order to achieve sustainable environmental development effectively.

To attain the foregoing objective, the present invention provides a thermal cracking system that includes: a driving unit with an automated overhead crane assembly, a material treatment unit, a preparation unit, and a thermal cracking treatment unit. The driving unit is connected to the material treatment unit, the preparation unit, and the thermal cracking treatment unit separately. The driving unit is configured to deliver or feed a material to the material treatment unit, the preparation unit, and the thermal cracking treatment unit. The material treatment unit includes a crushing device and a plurality of stock containers. The stock containers are adjacent to the output end of the crushing device. The preparation unit includes a plurality of combustion devices, a plurality of driving assemblies, and a plurality of bases. Each base is mounted with one of the driving assemblies so that each combustion device, when mounted on any of the driving assemblies, can be raised and lowered with respect to the base of the driving assembly. The thermal cracking treatment unit includes a thermal cracking module, a collection device, a condensation module, and an auxiliary fuel module. Each combustion device of the preparation unit can be mounted on the thermal cracking module in order to work under the control of the thermal cracking module and be adjacent to the collection device. The thermal cracking module is in communication with the condensation module and the auxiliary fuel module separately.

The thermal cracking system disclosed in the present invention is so designed that the thermal cracking module of the thermal cracking treatment unit is in communication with the condensation module and the auxiliary fuel module separately. This technical feature allows the thermal cracking module to obtain the required regenerated oil from the condensation module or the required regenerated auxiliary gas from the auxiliary fuel module, and use the regenerated oil or auxiliary gas as a combustible material in the combustion process of the thermal cracking module, thereby contributing substantially to recycling and reuse in order to achieve sustainable development of the environment effectively.

DETAILED DESCRIPTION OF THE INVENTION

Figure 1:
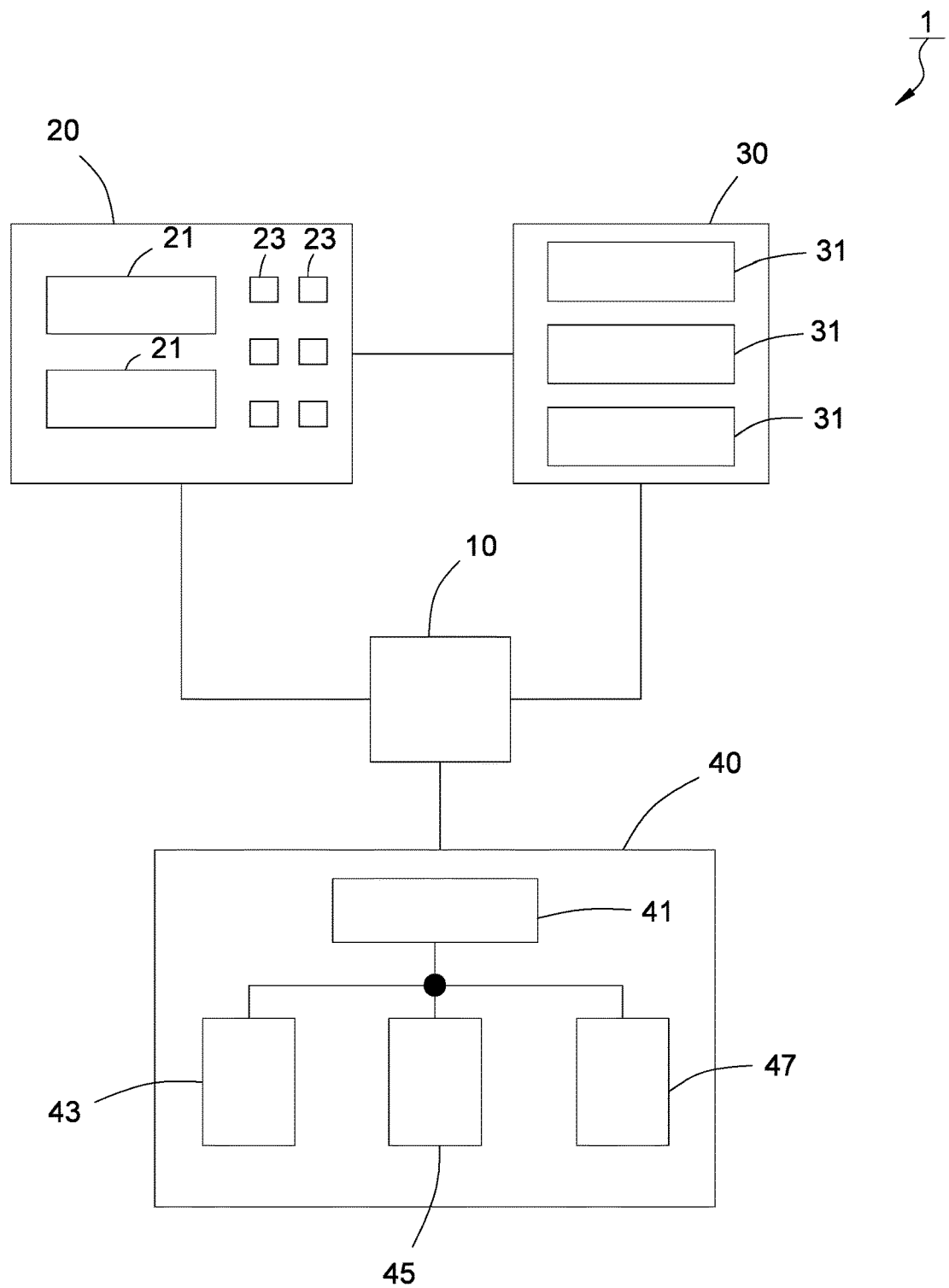
FIG. 1 schematically shows the system structure of a preferred embodiment of the present invention, or more particularly the entire structure of a thermal cracking system.

To start with, the applicant would like to point out that throughout this specification (including the following description of embodiments and the appended claims), all the direction-related terms make reference to the directions shown in the drawings listed in BRIEF DESCRIPTION OF THE SEVERAL VIEWS OF THE DRAWINGS. In addition, in the following description of embodiments and the drawings, identical or similar elements or structural features are indicated by the same reference numeral. Moreover, while the structural details, features, and methods of assembly, use, and manufacture of the present invention will be described in detail below, a person of ordinary skill in the art should be able to understand that the detailed description and the embodiments provided herein serve only to demonstrate that the invention can be implemented accordingly. The detailed description and the embodiments are not intended to be restrictive of the scope of the invention.

Figure 2:
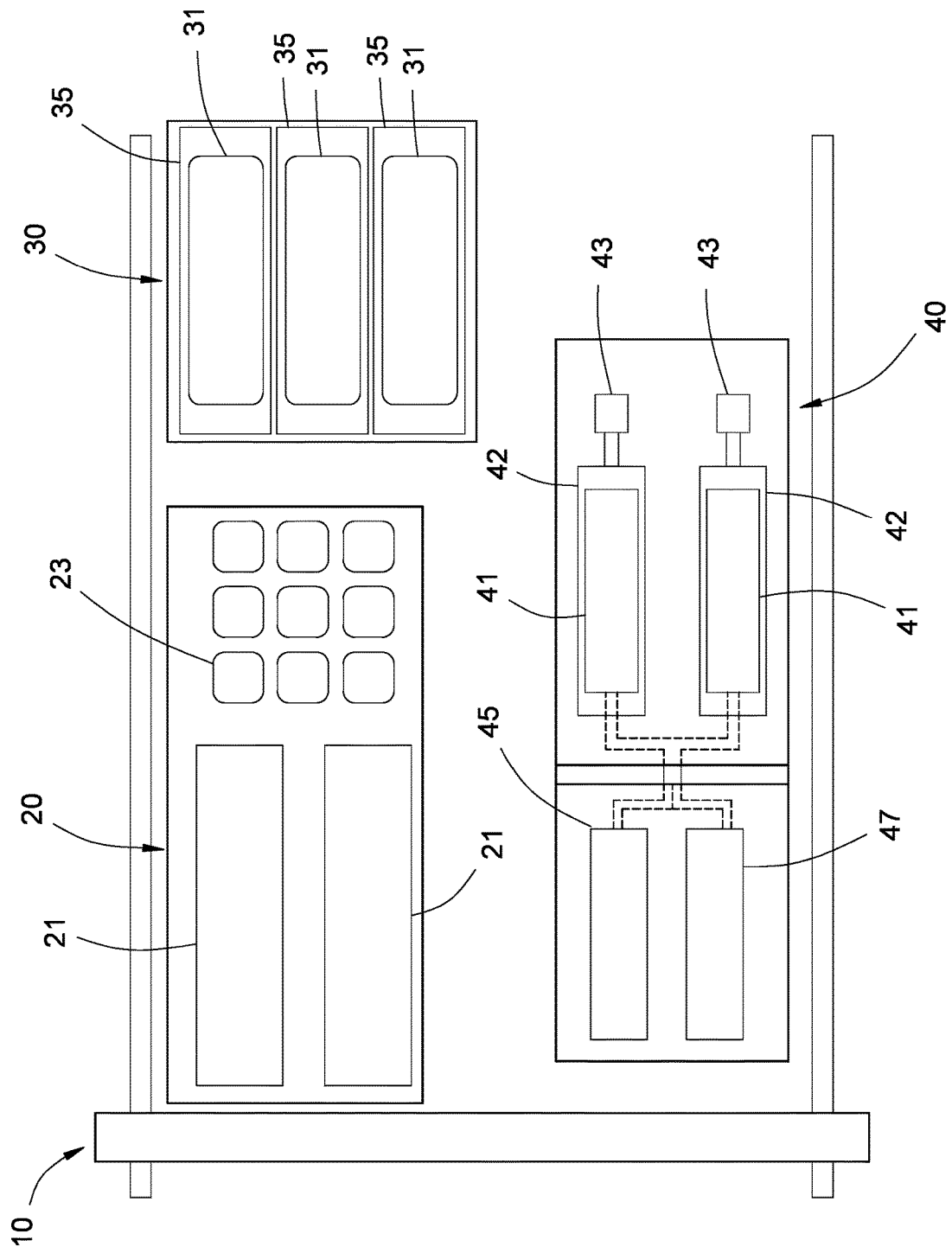
FIG. 2 schematically shows an application of the thermal cracking system in FIG. 1.
Figure 5:
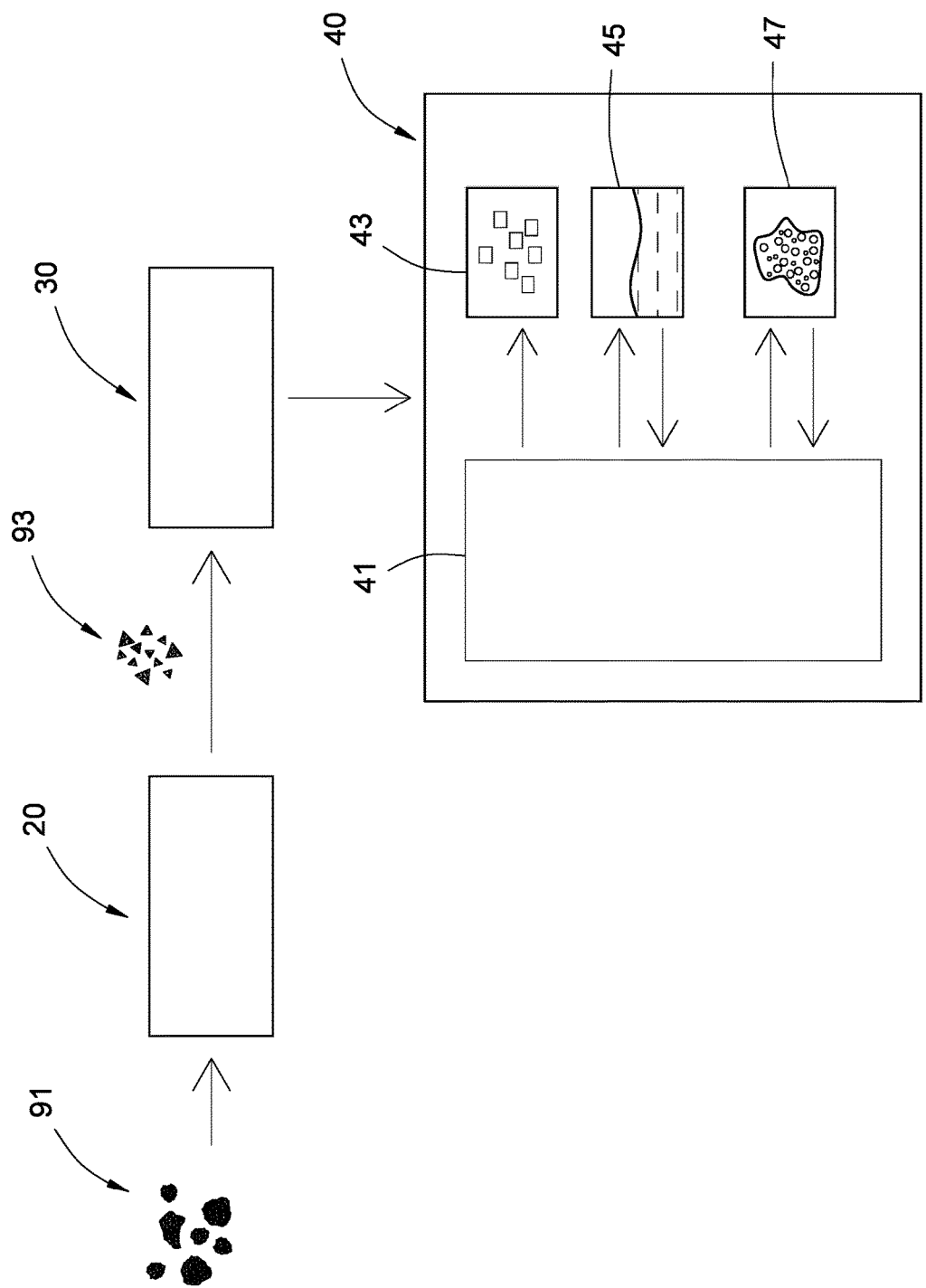
FIG. 5 is a partial system structure diagram similar to FIG. 1, showing in particular the operation of the material treatment unit, the preparation unit, and the thermal cracking treatment unit of the thermal cracking system.

Referring to FIG. 1 and FIG. 2, the thermal cracking system 1 according to a preferred embodiment of the present invention is configured to perform thermal cracking of waste 91 (see FIG. 5). The waste 91 includes but is not limited to plastic, rubber, synthetic resin, fiber, a combination of the above, and non-recyclable waste such as impurities. The thermal cracking system 1 includes a driving unit 10, a material treatment unit 20, a preparation unit 30, and a thermal cracking treatment unit 40. The driving unit 10 is connected to the material treatment unit 20, the preparation unit 30, and the thermal cracking treatment unit 40 separately. The driving unit 10 is composed essentially of an automated overhead crane assembly and serves mainly the purpose of delivery, or more particularly to deliver or feed a material to the material treatment unit 20, the preparation unit 30, and the thermal cracking treatment unit 40.

With continued reference to FIG. 2, the material treatment unit 20 includes two crushing devices 21 and a plurality of stock containers 23. The stock containers 23 are adjacent to the output ends of the two crushing devices 21. It is worth mentioning that one or a plurality of crushing devices 21 may be used, depending on the space of the operation site. Using a different number of crushing devices 21 is merely a simple change in quantity and therefore will not be dealt with any further.

Figure 3:
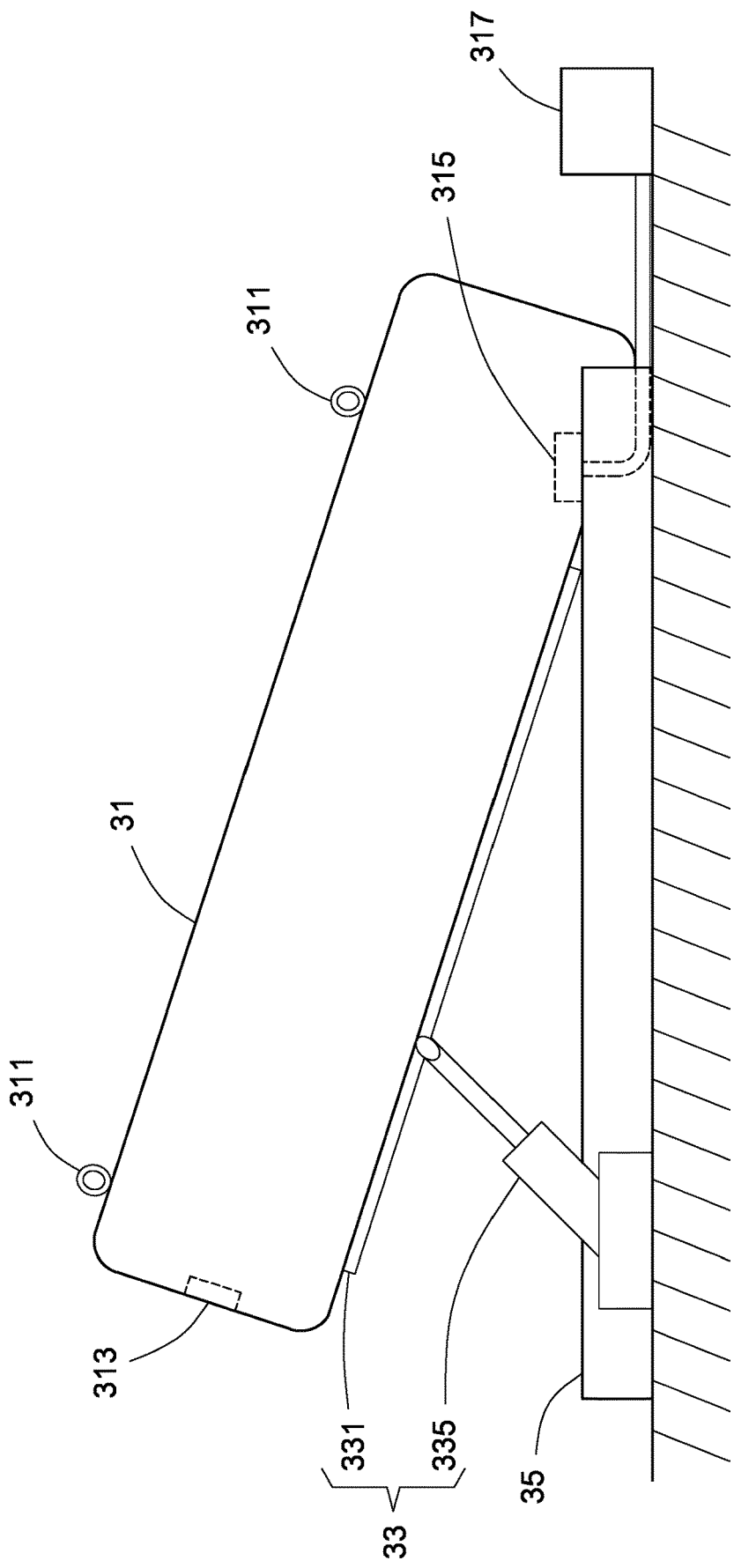
FIG. 3 is a schematic drawing of certain components in FIG. 1, showing in particular the raised state of a combustion device of the thermal cracking system.

Referring to FIG. 1 to FIG. 3, the preparation unit 30 includes three combustion devices 31, three driving assemblies 33, and three bases 35. Each base 35 is mounted with one of the driving assemblies 33 so that each combustion device 31, when mounted on any of the driving assemblies 33, can be raised and lowered with respect to the corresponding base 35. Preferably, each driving assembly 33 is composed essentially of a supporting plate 331 and a driving member 335, wherein the driving member 335 has one end pivotally connected to the supporting plate 331 and the opposite end mounted on the corresponding base 35 so that each combustion device 31, when mounted on the supporting plate 331 of any of the driving assemblies 33, can be raised and lowered with respect to the corresponding base 35. Each combustion device 31 has an elongated chamber and is provided with two lifting lugs 311 outside the chamber to facilitate hanging of the combustion device 31 from the automated overhead crane assembly of the driving unit 10. Each combustion device 31 has a major-axis direction, and the two opposite ends of each combustion device 31 in the major-axis direction are provided with an input opening 313 and an output opening 315 respectively. The interior of the chamber of each combustion device 31 is inclined at a predetermined angle from the input opening 313 toward the output opening 315 of the combustion device 31, making it easier for carbon black to be guided out of the output opening 315. Preferably, the input opening 313 of each combustion device 31 is closer to the driving member 335 of the corresponding driving assembly 33 than is the output opening 315, and the output opening 315 of each combustion device 31 is located at a bottom portion of the combustion device 31 and corresponds in position to the two lifting lugs 311 of the combustion device 31. Preferably, the output opening 315 of each combustion device 31 is in communication with a dust collection device 317 for collecting dust or impurities.

Referring to FIG. 1 to FIG. 5, the thermal cracking treatment unit 40 includes a thermal cracking module 41, a collection device 43, a condensation module 45, and an auxiliary fuel module 47. The thermal cracking module 41 is configured to carry out high-temperature combustion of the to-be-treated material 93 loaded in a combustion device 31 so that the to-be-treated material 93 is thermally cracked to sequentially produce a gaseous cracking product (such as a regenerated auxiliary gas, e.g., a regenerated fuel gas or other regenerated auxiliary gas having the same attribute, produced when the temperature of the combustion assembly of the thermal cracking module 41 is increased to about 200° C. to 230° C.), a regenerated cracked oil (e.g., produced when the temperature of the combustion assembly of the thermal cracking module 41 is increased to about 380° C. to 430° C.), regenerated carbon black (e.g., produced when the temperature of the combustion assembly of the thermal cracking module 41 is increased to about 450° C. to 500° C.), and regenerated steel cable wire (e.g., produced when the temperature of the combustion assembly of the thermal cracking module 41 is increased to about 500° C. to 550° C.). The collection device 43 is configured to collect and portion the solid cracking products (e.g., the regenerated carbon black and the regenerated steel cable wire obtained by thermal cracking) separately. The condensation module 45 is configured to cool and store the liquid cracking products (e.g., the regenerated cracked oil obtained by thermal cracking). The auxiliary fuel module 47 is configured to store the gaseous cracking products (e.g., the regenerated auxiliary gas obtained by thermal cracking). Preferably, the combustible material required for the thermal cracking module 41 can be supplied to the thermal cracking module 41 from the condensation module 45 through an element in communication with the thermal cracking module 41 and the condensation module 45, or from the auxiliary fuel module 47 through an element in communication with the thermal cracking module 41 and the auxiliary fuel module 47. In addition, the thermal cracking module 41 is provided with an elongated seat 42, and the seat 42 is inclined at a predetermined angle from one end toward the opposite end in the major-axis direction of the seat 42.

The thermal cracking system 1 disclosed in the foregoing preferred embodiment of the present invention has been described above along with the technical features of each component of the system. The following paragraphs will disclose the main steps and the intended effects of the thermal cracking operation to be performed on the waste 91 (which includes but is not limited to plastic, rubber, synthetic resin, fiber, a combination of the above, and non-recyclable waste such as impurities) by the thermal cracking system 1 disclosed in the preferred embodiment of the invention.

First, referring to FIG. 1 to FIG. 5, the waste 91 is delivered by the automated overhead crane assembly of the driving unit 10 to the two crushing devices 21 of the material treatment unit 20 in order to be roughly crushed. The roughly crushed waste 91 is then screened to yield the to-be-treated material 93, i.e., the material to be thermally cracked. After loading the to-be-treated material 93 into the stock containers 23, which are adjacent to the output ends of the two crushing devices 21, the automated overhead crane assembly of the driving unit 10 delivers the stock containers 23 of the material treatment unit 20 sequentially to the preparation unit 30 to load the to-be-treated material 93 in the stock containers 23 of the material treatment unit 20 into the combustion devices 31 through the input openings 313 thereof. The foregoing technical features of the present invention, or more particularly of the automated overhead crane assembly of the driving unit 10 of the thermal cracking system 1, involve the use of automated machine operations in place of such conventional advance operations as material preparation and chamber cleaning so that production capacity and operation availability can be greatly increased.

Second, referring to FIG. 1 to FIG. 4, the automated overhead crane assembly of the driving unit 10 delivers one of the combustion devices 31 of the preparation unit 30 to the seat 42 of the thermal cracking module 41 of the thermal cracking treatment unit 40 and places the combustion device 31 on the seat 42 in such a way that the combustion device 31 matches the seat 42 and is inclined in the same direction as the seat 42. The combustion device 31 is also brought into communication with the combustion assembly of the thermal cracking module 41 in order to operate under the control of the thermal cracking module 41 (e.g., being heated at a high temperature controlled by the thermal cracking module 41). The foregoing technical features allow the output opening 315 of the combustion deice 31 to correspond in position to the collection device 43, making it easier to collect and portion such solid cracking products as the regenerated carbon black and the regenerated steel cable wire obtained by thermal cracking.

Third, referring to FIG. 1 to FIG. 5, the combustible material required for the thermal cracking module 41 can be supplied to the thermal cracking module 41 from the condensation module 45 through an element in communication with the thermal cracking module 41 and the condensation module 45, or from the auxiliary fuel module 47 through an element in communication with the thermal cracking module 41 and the auxiliary fuel module 47. This technical feature allows the thermal cracking module 41 to obtain the required regenerated oil from the condensation module 45 or the required regenerated auxiliary gas from the auxiliary fuel module 47, and use the regenerated oil or auxiliary gas as a combustible material in the combustion process of the thermal cracking module 41, thereby contributing substantially to recycling and reuse in order to achieve sustainable environmental development effectively.

Figure 4:
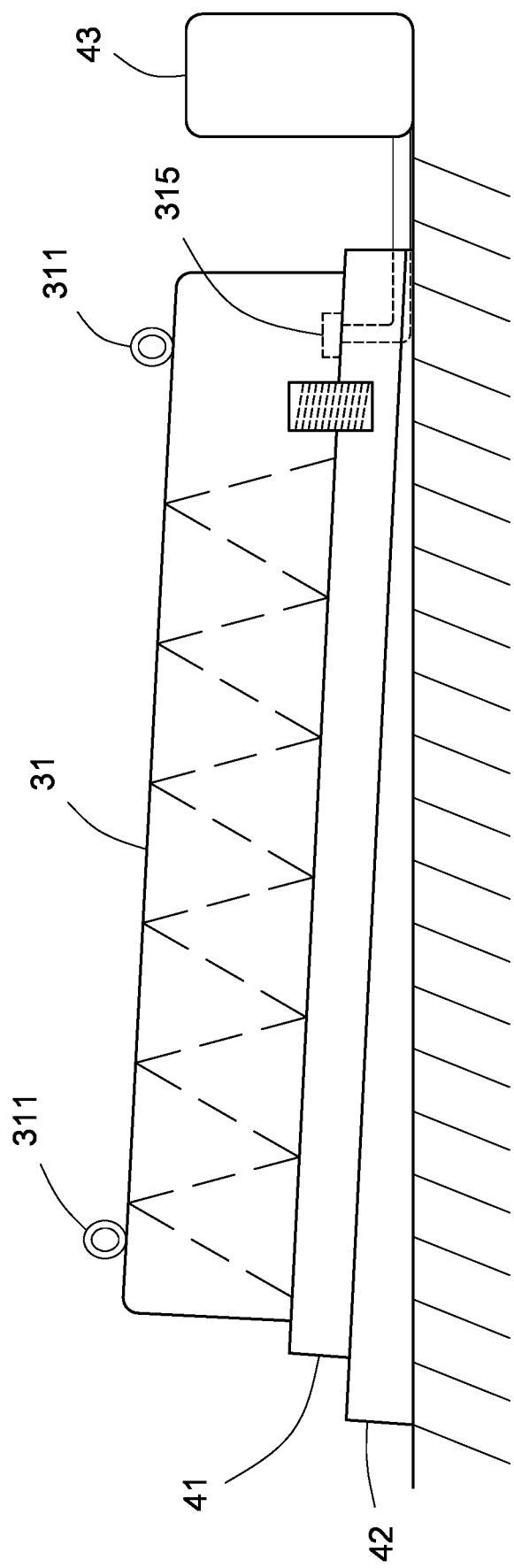
FIG. 4 is a schematic drawing of certain components in FIG. 1, showing in particular the working state of a combustion device of the thermal cracking system, with the combustion device mounted on a thermal cracking module.

Fourth, referring to FIG. 2 and FIG. 4, once the thermal cracking process in the combustion device 31 is completed, the automated overhead crane assembly of the driving unit 10 hoists the combustion device 31 again and returns the combustion device 31 to the corresponding vacant space in the preparation unit 30, where the used combustion device 31 goes through a chamber cooling and cleaning operation. In the meantime, another combustion device 31 of the preparation unit 30 that has been loaded with the to-be-treated material 93 is hoisted by the automated overhead crane assembly of the driving unit 10, is delivered to and placed on the seat 42 of the thermal cracking module 41 of the thermal cracking treatment unit 40, and is brought into communication with the thermal cracking module 41 in order to work under the control of the thermal cracking module 41. The foregoing technical feature of the present invention, i.e., the driving unit 10 of the thermal cracking system 1 disclosed herein being able to move back and forth among the material treatment unit 20, the preparation unit 30, and the thermal cracking treatment unit 40, makes it possible to load the plural combustion devices 31 of the preparation unit 30 with the to-be-treated material 93 in advance (i.e., to carry out material preparation beforehand) so that the thermal cracking system 1 as a whole can operate in a quasi-continuous manner thanks to the rapid delivery operation of the automated overhead crane assembly of the driving unit 10.

What is claimed is:

1. A thermal cracking system (1), comprising:
   a driving unit (10) having an automated overhead crane assembly; a material treatment unit (20); a preparation unit (30); and a thermal cracking treatment unit (40), wherein:
   the driving unit (10) is connected to the material treatment unit (20), the preparation unit (30), and the thermal cracking treatment unit (40) separately, and the driving unit (10) is configured to deliver or feed a material to the material treatment unit (20), the preparation unit (30), and the thermal cracking treatment unit (40);
   the material treatment unit (20) comprises a crushing device (21) and a plurality of stock containers (23), and the stock containers (23) are adjacent to an output end of the crushing device (21);
   the preparation unit (30) comprises a plurality of combustion devices (31), a plurality of driving assemblies (33), and a plurality of bases (35), and each said base (35) is mounted with a said driving assembly (33) so that each said combustion device (31), when mounted on any one of the driving assemblies (33), is able to be raised and lowered with respect to the base (35) of the any one of the driving assemblies (33); and
   the thermal cracking treatment unit (40) comprises a thermal cracking module (41), a collection device (43), a condensation module (45), and an auxiliary fuel module (47), and each said combustion device (31) of the preparation unit (30) is configured to be mounted on the thermal cracking module (41) in order to operate under control of the thermal cracking module (41) and be adjacent to the collection device (43), and the thermal cracking module (41) is in communication with the condensation module (45) and the auxiliary fuel module (47) separately.

2. The thermal cracking system (1) of claim 1, wherein each said combustion device (31) of the preparation unit (30) has an elongated chamber, a major-axis direction, and two opposite ends in the major-axis direction, the two opposite ends of each said combustion device (31) are provided with an input opening (313) and an output opening (315) respectively, and an interior of the chamber of each said combustion device (31) is inclined at a predetermined angle from the input opening (313) toward the output opening (315) of the each said combustion device (31).

3. The thermal cracking system (1) of claim 2, wherein when each said combustion device (31) of the preparation unit (30) is mounted on any one of the driving assemblies (33), the input opening (313) of the each said combustion device (31) is closer to a driving member (335) of the any one of the driving assemblies (33) than is the output opening (315) of the each said combustion device (31), and wherein the output opening (315) of each said combustion device (31) is located at a bottom portion of the each said combustion device (31).

4. The thermal cracking system (1) of claim 3, wherein the thermal cracking module (41) of the thermal cracking treatment unit (40) is provided with an elongated seat (42), and the seat (42) is inclined at a predetermined angle from one end toward an opposite end of the seat (42) in a major-axis direction of the seat (42).

5. The thermal cracking system (1) of claim 4, wherein each said combustion device (31) of the preparation unit (30) is provided with two lifting lugs (311) outside the chamber of the each said combustion device (31), and the two lifting lugs (311) of each said combustion device (31) correspond in position to the output opening (315) located at the bottom portion of the each said combustion device (31).

6. The thermal cracking system (1) of claim 5, wherein the automated overhead crane assembly of the driving unit (10) is configured to deliver one of the combustion devices (31) of the preparation unit (30) to the seat (42) of the thermal cracking module (41) of the thermal cracking treatment unit (40) and place the one of the combustion devices (31) on the seat (42) in such a way that the one of the combustion devices (31) matches, and is inclined in a same direction as, the seat (42).

7. The thermal cracking system (1) of claim 6, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

8. The thermal cracking system (1) of claim 4, wherein the automated overhead crane assembly of the driving unit (10) is configured to deliver one of the combustion devices (31) of the preparation unit (30) to the seat (42) of the thermal cracking module (41) of the thermal cracking treatment unit (40) and place the one of the combustion devices (31) on the seat (42) in such a way that the one of the combustion devices (31) matches, and is inclined in a same direction as, the seat (42).

9. The thermal cracking system (1) of claim 8, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

10. The thermal cracking system (1) of claim 1, wherein the thermal cracking module (41) of the thermal cracking treatment unit (40) is provided with an elongated seat (42), and the seat (42) is inclined at a predetermined angle from one end toward an opposite end of the seat (42) in a major-axis direction of the seat (42), wherein the automated overhead crane assembly of the driving unit (10) is configured to deliver one of the combustion devices (31) of the preparation unit (30) to the seat (42) of the thermal cracking module (41) of the thermal cracking treatment unit (40) and place the one of the combustion devices (31) on the seat (42) in such a way that the one of the combustion devices (31) matches, and is inclined in a same direction as, the seat (42).

11. The thermal cracking system (1) of claim 10, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

12. The thermal cracking system (1) of claim 2, wherein the thermal cracking module (41) of the thermal cracking treatment unit (40) is provided with an elongated seat (42), and the seat (42) is inclined at a predetermined angle from one end toward an opposite end of the seat (42) in a major-axis direction of the seat (42), wherein the automated overhead crane assembly of the driving unit (10) is configured to deliver one of the combustion devices (31) of the preparation unit (30) to the seat (42) of the thermal cracking module (41) of the thermal cracking treatment unit (40) and place the one of the combustion devices (31) on the seat (42) in such a way that the one of the combustion devices (31) matches, and is inclined in a same direction as, the seat (42).

13. The thermal cracking system (1) of claim 12, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

14. The thermal cracking system (1) of claim 3, wherein the thermal cracking module (41) of the thermal cracking treatment unit (40) is provided with an elongated seat (42), and the seat (42) is inclined at a predetermined angle from one end toward an opposite end of the seat (42) in a major-axis direction of the seat (42), wherein the automated overhead crane assembly of the driving unit (10) is configured to deliver one of the combustion devices (31) of the preparation unit (30) to the seat (42) of the thermal cracking module (41) of the thermal cracking treatment unit (40) and place the one of the combustion devices (31) on the seat (42) in such a way that the one of the combustion devices (31) matches, and is inclined in a same direction as, the seat (42).

15. The thermal cracking system (1) of claim 14, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

16. The thermal cracking system (1) of claim 1, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

17. The thermal cracking system (1) of claim 2, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

18. The thermal cracking system (1) of claim 3, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

19. The thermal cracking system (1) of claim 4, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

20. The thermal cracking system (1) of claim 5, wherein each said driving assembly (33) of the preparation unit (30) is composed essentially of a supporting plate (331) and a driving member (335), and each said driving member (335) has one end pivotally connected to a corresponding said supporting plate (331) and an opposite end mounted on a corresponding said base (35) so that each said combustion device (31), when mounted on the supporting plate (331) of any one of the driving assemblies (33), is able to be raised and lowered with respect to the base (35) of the any one of the driving assemblies (33).

* * * * *